United States Patent [19]

Tamai et al.

[11] 4,262,540
[45] Apr. 21, 1981

[54] PRESSURE MEASURING DEVICE

[75] Inventors: Mitsuru Tamai; Takeshi Yasuhara, both of Kawasaki, Japan

[73] Assignee: Fuji Electric Co., Ltd., Kawasaki, Japan

[21] Appl. No.: 88,423

[22] Filed: Oct. 25, 1979

[30] Foreign Application Priority Data

Nov. 2, 1978 [JP] Japan ................................ 53/135626

[51] Int. Cl.³ .............................................. G01L 9/12
[52] U.S. Cl. ...................................... 73/718; 361/283
[58] Field of Search ..................... 73/718, 724, 708; 361/283

[56] References Cited

U.S. PATENT DOCUMENTS

| 3,965,746 | 6/1976 | Rabek | 73/718 |
| 4,158,311 | 6/1979 | Yasuhara et al. | 73/718 |
| 4,169,389 | 10/1979 | Yasuhara et al. | 73/718 |

Primary Examiner—Donald O. Woodiel

Attorney, Agent, or Firm—Sughrue, Rothwell, Mion, Zinn and Macpeak

[57] ABSTRACT

A pressure sensor the output of which is substantially immune from errors caused by temperature variation or exteriorly applied forces. An insulating disc with metal foil electrodes on the flat surfaces thereof is disposed in an inner cylinder housing between a pressure measuring diaphragm and a reference electrode plate. A first measurement pressure is applied directly to the opposite side of the diaphragm and a second measurement pressure is applied to the side adjacent the insulating disc via a soft rubber diaphragm and an insulating liquid which fills the space between the soft rubber diaphragm and measuring diaphragm extending through apertures in the inner cylinder and insulating disc. The difference pressure is determined by measuring the capacitance difference between capacitors formed by the reference electrode plate and the metal foil layer adjacent thereto and the measuring diaphragm and the metal foil layer adjacent thereto.

6 Claims, 3 Drawing Figures

PRESSURE MEASURING DEVICE

BACKGROUND OF THE INVENTION

The invention relates most generally to a pressure measuring device.

Conversion of a pressure into electrical data is useful for indicating and controlling the measure pressure. FIG. 1 shows a sectional view of a conventional pressure measuring device. A disc-shaped insulator 2 is inserted into a cylinder 1. The two end faces of the insulator 2 are formed with concave surfaces 3A and 3B, respectively. Metal foil electrodes 4A and 4B are provided on the concave surfaces 3A and 3B, respectively. Lead wires 5A and 5B connected respectively to the electrodes 4A and 4B which extend outside the device through inside the insulator 2 and a hermetic seal 7 which completely closes a hole 6 formed in the wall of the cylinder 1. A through-hole 8 extending from the end face 3A to the end face 3B is formed in the insulator 2. Pressure measuring diaphragms 9A and 9B are welded to the two end faces of the cylinder 1 so that the assembly of the diaphragms and the cylinder is liquid-tight. The space in the interior of the assembly of the diaphragms and the cylinder is filled with an insulating liquid such as silicone oil. The insulating liquid electrically insulates the electrodes 4A and 4B from the pressure measuring diaphragms 9A and 9B and serves as pressure transmitting means between the inner surfaces of the pressure measuring diaphragms 9A and 9B. The electrodes 4A and 4B and the pressure measuring diaphragms 9A and 9B confront each other through the insulating liquid thus forming a capacitor. Connection plates 12A and 12B have recesses 10A and 10B and through-holes 11A and 11B, respectively. The end faces of the connection plates 12A and 12B, where the recesses 10A and 10B are formed respectively, are placed on the outer surfaces of the pressure measuring diaphragms 9A and 9B, respectively, and the connection plates 12A and 12B are fixedly mounted on the pressure measuring diaphragms and are tightened by bolts 13 and nuts 14.

When different measurement pressures are applied to the device through the through-holes 11A and 11B, the pressure measuring diaphragms are deformed by the difference between the measurement pressures and accordingly the capacitance of the capacitor formed by the electrodes 4A and 4B is changed whereby the pressure difference can be detected.

However, the conventional pressure measuring device is disadvantageous in the following points. When the ambient temperature is increased, the insulating liquid expands and accordingly the pressure measuring diaphragms 9A and 9B are pushed outwardly so that the capacitance of the capacitor formed by the electrodes 4A and 4B is changed as a result of which a measured pressure value includes an error. When the ambient temperature greatly decreases so as to significantly contract the volume of the insulating liquid, the pressure measuring diaphragms cannot deform properly following the contraction of the insulating liquid. As a result, a vacuum space called "Torricelli's vacuum" is formed in the insulating liquid making it impossible for the insulating liquid to transmit the pressure correctly so that the pressure is again measured erroneously.

Generally, the cylinder 1 has been made of stainless steel, while the pressure measuring diaphragms 9A and 9B have been of material high in elasticity. That is, the cylinder 1 has a different temperature expansion coefficient from that of the pressure measuring diaphragms 9A and 9B. Accordingly, the amount of radial expansion or contraction of the peripheral portions of the pressure measuring diaphragms 9A and 9B is different from that of the two end faces of the cylinder 1 on which the pressure measuring diaphragms 9A and 9B are mounted. Therefore, the force which pulls the pressure measuring diaphragms radially is changed resulting in an error in the measured pressure.

The connection plates 12A and 12B are mounted by means of the bolts 13 and the nuts 14 in order to apply pressure to the pressure measuring diaphragms 9A and 9B, as described above. However, this causes yet another problem. That is, the cylinder 1 is contracted axially by the tightening force of the bolts 13 and the nuts 14 so that the distances between the electrode 4A and the diaphragm 9A and between the electrode 4B and 9B are changed which induces thereby an error in the pressure measurement.

Accordingly, an object of this invention is to provide a pressure measuring device having a high measurement accuracy in which all of the above-described difficulties accompanying a conventional pressure measuring device have been eliminated.

SUMMARY OF THE INVENTION

The foregoing object of the invention has been achieved by the provision of a pressure measuring device which according to the invention, includes a detecting section including an inner cylinder, a disc-shaped diaphragm base having a through-hole extending from one end face thereof to the other end face thereof, the diaphragm base being mounted on one end face of the inner cylinder, a pressure measuring diaphragm mounted on one end face of the diaphragm base in the inner cylinder, a disc-shaped insulator having a through-hole extending from one end face thereof to the other end face thereof and two metal foil electrodes provided respectively on the two end faces thereof, the insulator being inserted into the inner cylinder in such a manner the distance between one of the electrodes and the pressure measuring diaphragm is maintained at a predetermined value, and a disc-shaped reference electrode plate having a through-hole extending from one end face thereof to the other end face thereof, the reference electrode plate being mounted on the other end face of the inner cylinder in such a manner that the distance between the one end face thereof and the other electrode on the other end face of the insulator is maintained at a predetermined value; a bottomed outer cylinder having at one end a bottom with a through-hole, the detecting section being inserted into the outer cylinder with the diaphragm base directed towards the bottom; a seal diaphragm closing the other end face of the outer cylinder with one of two measurement pressures being applied to the seal diaphragm; and a pipe welded to the through-holes of the outer cylinder and the diaphragm base to introduce the other measurement pressure into a first space which is defined by the diaphragm base and the pressure measuring diaphragm; a sealed spaced being provided by the outer cylinder and the seal diaphragm except for the first space which is filled with an insulating liquid.

DESCRIPTION OF THE PREFERRED EMBODIMENTS

Figure 1:
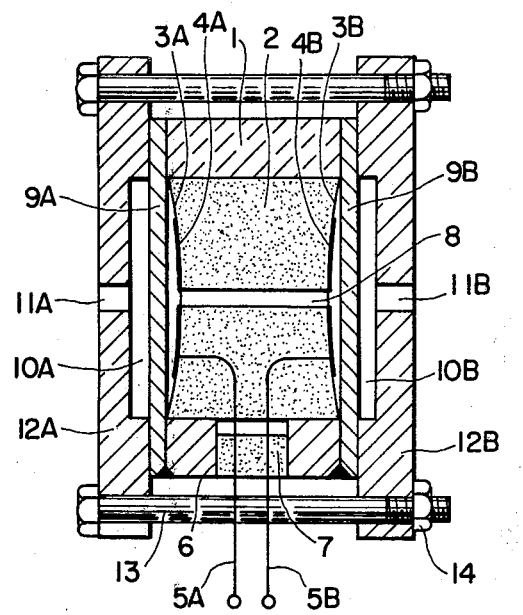
FIG. 1 is a longitudinal cross-sectional view of a conventional pressure measuring device.
Figure 3:
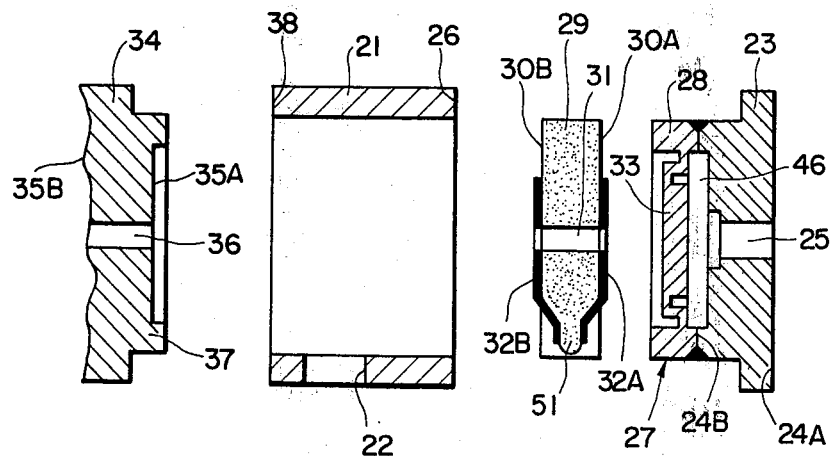
FIG. 3 is a longitudinal cross-sectional view showing the components of a detecting section of the pressure measuring device shown in FIG. 2.
Figure 2:
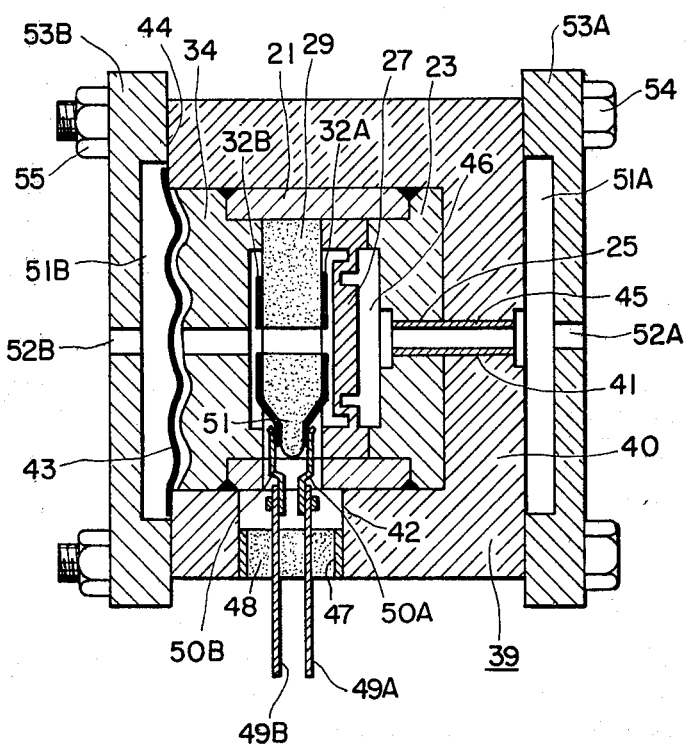
FIG. 2 is a longitudinal cross-sectional view of an example of a pressure measuring device according to the invention.

A preferred embodiment of the invention will be described with reference to FIGS. 2 and 3 where FIG. 2 is a cross-sectional view of a pressure measuring device according to the invention and FIG. 3 is a cross-sectional view of the components of a detecting section in the pressure measuring device in FIG. 2.

First, the detecting section will be described with reference to FIG. 3. The wall of an inner cylinder 21 has a through-hole 22 which extends from the inner surface to the outer surface of the wall. A diaphragm base 23 in the form of a disc has a through-hole 25 extending from one end face 24A to the other end face 24B. The diaphragm base 23 is welded to one end face 26 of the inner cylinder 21 with the end face 24B oriented towards the inner cylinder 21. A pressure measuring diaphragm 27 in the form of a disc is provided within the inner cylinder 21. More specifically, the peripheral portion 28 of the diaphragm 27 is welded to the end face 24B of the diaphragm base 23. An insulator 29, also in the form of a disc, has a through-hole 31 extending from one end face 30A to its other end face 30B. Metal foil electrodes 32A and 32B are provided on the end faces 30A and 30B, respectively. The assembly of the insulator 29 and the electrodes 32A is inserted into the inner cylinder 21 in such a manner that the end face 30A is in contact with the peripheral portion 28 of the pressure measuring diaphragm 27. Thus, the distance between the electrode 32A and the measuring part of the pressure measuring diaphragm 27 is maintained constant. A disc-shaped reference electrode plate 34 has a through-hole 36 extending from one end face 35A to its other end face 35B. The reference electrode plate 34 is welded to the other end face 38 of the inner cylinder 21 in such a manner that the protrusion 37 of the end face 35A is in contact with the end face 30B of the insulator 29 and the distance between the end face 35A and the electrode 32B is maintained constant. The detecting section is formed as described above.

An outer cylinder 39 has a bottom 40 at one end thereof. The bottom 40 has a through-hole 41. The wall of the outer cylinder 39 has a through-hole 42 extending from its inner surface to its outer surface. The detecting section is placed in the outer cylinder 39 with the diaphragm base 23 directed towards the bottom 40. The peripheral portion of a seal diaphragm 43 is welded to the other end face 44 of the outer cylinder 39. One measurement pressure is applied to the outer surface of the seal diaphragm 43. A pipe 45 having a small wall thickness is inserted into the through-hole 41 of the outer cylinder 39 and the through-hole 25 of the diaphragm base 23 and the two ends of the pipe 45 are welded to the outer cylinder 39 and the diaphragm base 23 so that the other measurement pressure is introduced into the space defined by the diaphragm base 23 and the pressure measuring diagram 27.

A lead means is provided including a metal cylinder 47, a hermetic seal 48 positioned in the metal cylinder 47, lead conductors 49A and 49B extending through the hermetic seal 48, and elastic conductors 50A and 50B which are connected to the end portions of the lead conductors 49A and 49B, respectively. The lead means is inserted into the lead through-holes 42 and 22 with the elastic contactors 50A and 50B directed towards the detecting section so that the elastic conductors 50A and 50B are brought into contact with the electrodes 32A and 32B, respectively, which are extended over the thin portion 51 of the insulator 29 and the electrodes 32A and 32B are electrically connected to the lead conductors 49A and 49B, respectively, which are disposed outside the outer cylinder. Thereafter, the metal cylinder 47 is welded to the outer cylinder 39 to close the lead through-hole 42. The space sealed by the outer cylinder 39 and the seal diaphragm 43, except the space and the inside of the pipe 45, is filled with an insulating liquid.

With the invention, the inner cylinder 21, the diaphragm base 23, the pressure measuring diaphragm 27, the insulator 29 and the reference electrode plate 34, which together form the detecting section, are made of materials which have substantially equal thermal expansion coefficients. The inner cylinder 21, the diaphragm base 23, the pressure measuring diaphragm 27 and the reference electrode plate 34 are made of the same metal, such as for instance a metal whose trade name is "Nickelspan-C" and have a thermal expansion coefficient of about $(8.0\pm0.4)\times10^{-6}/°C$. The insulator 29 may for instance be made of forsterite also having a thermal expansion coefficient of about $(8.0\pm0.3)\times10^{-6}/°C$. With proper choice of materials, the thermal expansion coefficient of the detecting section assembly should be made to be approximately $(8.0\pm0.05)\times10^{-6}/°C$. Furthermore, in the invention, the elastic hardness of the seal diaphragm 43 is such that it is several tens to several hundreds of times as soft as the pressure measuring diaphragm 27.

Connection plates 53A and 53B include recesses 51A and 51B and through-holes 52A and 52B. The connection plates 53A and 53B are placed on the two end faces of the pressure measuring device as described above and are then fixedly mounted thereon tightened by means of bolts 54 and nuts 55. Different measurement pressures are applied through the through-holes 52A and 52B to the pressure measuring device. One of the measurement pressures applied through the through-hole 52B is transmitted through the seal diaphragm 54 to the insulating liquid thus reaching the left side of the pressure measuring diaphragm 27 through the through-holes 36 and 31. The other measurements pressure applied through the through-holes 52A reaches the right side of the pressure measuring diaphragm 27 through the pipe 45. As a result, the pressure measuring diaphragm 27 is deformed by the difference between the right and left measurement pressures and accordingly the capacitance of a capacitor formed by the pressure measuring diaphragm 27 and the electrode 32A is varied. This capacitance is compared with the fixed capacitance of a capacitor formed by the reference electrode plate 34 and the electrode 32B and the amount of variation thereof is measured thereby to obtain the difference between the two different measurement pressures.

In the pressure measuring device according to the invention, since the seal diaphragm is so formed that its elastic hardness is generally soft, it can satisfactorily follow the expansion and construction of the insulating liquid due to temperature variation. Accordingly, in the device of the invention, the pressure measuring diaphragm is never permanently deformed and no Torricelli's vacuum is created. Furthermore, according to the invention, the inner cylinder, the diaphragm base, the pressure measuring diaphragm, the insulator and the reference electrode plate which together form the detecting section, are made of materials which have substantially equal thermal expansion coefficients. Accordingly, even if the ambient temperature changes, no internal stress occurs in the detecting section and the force pulling the pressure measuring diaphragm radially is not changed. In addition, even if force is exerted on the outer cylinder in the axial direction thereof, the force is not transmitted to the detecting section and accordingly the distances between the pressure measuring diaphragm and one of the electrodes and between the other electrode and the reference electrode plate are maintained unchanged. Thus, the device according to the invention has substantially no error in the output pressure measurement.

What is clamed is:

1. A pressure measuring device comprising:
a detecting section including an inner cylinder; a disc-shaped diaphragm base having a through-hole extending from one end face thereof to the other end face thereof, said diaphragm base being mounted on one end face of said inner cylinder; a pressure measuring diaphragm mounted on one end face of said diaphragm base in said inner cylinder; a disc-shaped insulator having a through-hole extending from one end face thereof to the other end face thereof and two metal foil electrodes provided respectively on said two end faces thereof, said insulator being positioned in said inner cylinder in such a manner that the distance between one of said electrodes and said pressure measuring diaphragm is maintained at a first predetermined value; and a disc-shaped reference electrode plate having a through-hole extending from one end face thereof to the other end face thereof, said reference electrode plate being mounted on the other end face of said inner cylinder in such a manner that the distance between the one end face thereof and the other electrode on the other end face of said insulator is maintained at a second predetermined value;
an outer cylinder having at a first end thereof a bottom portion with a through-hole, said detecting section being positioned in said outer cylinder with said diaphragm base directed towards said bottom portion;
a seal diaphragm closing a second end of said outer cylinder, a first measurement pressure being applied to said seal diaphragm;
a tubular member attached to said outer cylinder at said through-hole of said outer cylinder and said diaphragm base at said through-hole of said diaphragm base for introducing a second measurement pressure into a first space defned by said diaphragm base and said pressure measuring diaphragm;
a sealed space being provided by said outer cylinder and said seal diaphragm with the exception of said first space filled with an insulating liquid.

2. A pressure measuring device as claimed in claim 1 wherein said inner cylinder, said diaphragm base, said pressure measuring diaphragm, said insulator and said reference electrode plate are made of materials which have substantially equal thermal expansion coefficients.

3. A pressure measuring device as claimed in either claim 1 or 2 wherein the elastic hardness of said seal diaphragm is several tens to several hundreds of times as soft as that of said pressure measuring diaphragm.

4. A pressure measuring device as claimed in either claim 1 or 2 further comprising first and second conductive leads extending through a through-hole in said outer cylinder and means for hermetically sealing said leads in said through-hole.

5. A pressure measuring device comprising:
a conductive housing;
an insulating member having first and second flat parallel surfaces and a through-hole therethrough and with said first surface disposed parallel to a wall of said housing;
first and second conductors disposed respectively on said first and second parallel surfaces;
a conductive diaphragm disposed in said housing with a first side thereof parallel to said second surface;
means for supplying a first measurement pressure to a second side of said diaphragm opposite said first side;
means for supplying a second measurement pressure to a space between said first surface of said insulating member and said wall of said housing; and
wherein said housing, said diaphragm and said insulating member have substantially equal thermal expansion coefficients.

6. A pressure measuring device as claimed in claim 5 wherein said means for supplying said second measurement pressure comprises a soft, flexible diaphragm and an insulating liquid disposed in said space.

* * * * *